(12) United States Patent
Ikai et al.

(10) Patent No.: US 10,503,130 B2
(45) Date of Patent: Dec. 10, 2019

(54) CONTROLLER

(71) Applicant: FANUC CORPORATION, Minamitsuru-gun, Yamanashi (JP)

(72) Inventors: Satoshi Ikai, Yamanashi (JP); Naoto Sonoda, Yamanashi (JP); Ryoutarou Tsuneki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 13 days.

(21) Appl. No.: 15/946,276

(22) Filed: Apr. 5, 2018

(65) Prior Publication Data

US 2018/0292792 A1 Oct. 11, 2018

(30) Foreign Application Priority Data

Apr. 7, 2017 (JP) .................... 2017-076917

(51) Int. Cl.
G05B 13/00 (2006.01)
G05B 15/02 (2006.01)
G06N 20/00 (2019.01)

(52) U.S. Cl.
CPC ............ *G05B 15/02* (2013.01); *G06N 20/00* (2019.01); *G05B 2219/34013* (2013.01); *G05B 2219/43171* (2013.01)

(58) Field of Classification Search
CPC .................. G05B 15/02; G06N 20/00
USPC ........................................ 318/561
See application file for complete search history.

(56) References Cited

U.S. PATENT DOCUMENTS 4,064,444 A 12/1977 Hoang

FOREIGN PATENT DOCUMENTS

| JP | 7-5904 | 1/1995 |
|---|---|---|
| JP | 7-49702 | 2/1995 |
| JP | 7-210207 | 8/1995 |
| JP | 9-160638 | 6/1997 |
| JP | 2007-115101 | 5/2007 |

(Continued)

OTHER PUBLICATIONS

Notification of Reasons for Refusal dated Dec. 18, 2018 in corresponding Japanese Application No. 2017-076917.

(Continued)

*Primary Examiner* — Erick D Glass
(74) *Attorney, Agent, or Firm* — Wenderoth, Lind & Ponack, L.L.P.

(57) ABSTRACT

A controller capable of preventing a control target from being controlled by an abnormal value output from a mathematical model is provided. A controller includes a control unit, the control unit including: a first correction amount computation unit that computes a first correction amount for correction from a command value to a second command value; a second correction amount computation unit that computes a second correction amount for correction from the command value to the second command value; and a correction amount selecting unit that selects either one of the first correction amount and the second correction amount. The first correction amount computation unit computes the first correction amount using a first mathematical model configured by machine learning, and the second correction amount computation unit computes the second correction amount using a second mathematical model configured by a method different from that of the first correction amount computation unit.

6 Claims, 6 Drawing Sheets

(56) References Cited

FOREIGN PATENT DOCUMENTS

JP  2008-257348  10/2008
JP  2009-237916  10/2009

OTHER PUBLICATIONS

Notification of Reasons for Refusal dated Feb. 26, 2019 in corresponding Japanese Patent Application No. 2017-076911.
Notification of Reasons for Refusal dated May 21, 2019 in Japanese Patent Application No. 2017-076917.

CONTROLLER

This application is based on and claims the benefit of priority from Japanese Patent Application No. 2017-076917, filed on 7 Apr. 2017, the content of which is incorporated herein by reference.

BACKGROUND OF THE INVENTION

Field of the Invention

The present invention relates to a controller for controlling a servomotor and a spindle motor of a machine tool, a robot, and an industrial machine.

Related Art

In such a controller, a technique of correcting commands by performing feed-forward control is known. Examples of feed-forward control include feed-forward control of creating a correction amount of a speed command from a position command value, feed-forward control of creating a correction amount of a current command from a position command value, feed-forward control of creating a correction amount of a current command from a speed command value, and the like. By using these feed-forward control methods, it is possible to decrease a positional deviation (=(position command value)−(position feedback)) with respect to a position command value and a speed deviation (=(speed command value)−(speed feedback)) with respect to a speed command value in a state in which there is no disturbance. In this way, it is possible to increase trackability with respect to a position command or a speed command. That is, the time until a positional deviation reaches 0 or falls within a predetermined range decreases.

A high-order mathematical model of these feed-forward control methods can decrease a change in acceleration as well as a positional deviation and a speed deviation with respect to the change in acceleration. However, since it is difficult to determine the parameters of a high-order mathematical model, the coefficients of the mathematical model may be set using machine learning.

For example, the present applicant filed an application, Japanese Patent Application No. 2017-049608, which discloses a machine learning device and a machine learning method capable of avoiding complex adjustment of the coefficients of high-order feed-forward control when the order of feed-forward control is made higher to reduce a positional deviation and to improve trackability with respect to a position command in a controller which uses feed-forward control of creating a correction amount of a current command from a position command value.

Basically, in a process of performing a feed-forward computation process indicated by a transfer function Gf(s) represented by mathematical formula 1 (Math. 1) and calculating a correction amount for correction from a position command value to a current command value, the correction amount is calculated on the basis of machine learning by calculating control parameters $a_i$ and $b_j$ by machine learning (reinforcement learning).

$$Gf(s) = \frac{b_0 + b_1 s + b_2 s^2 + \ldots}{a_0 + a_1 s + a_2 s^2 + \ldots} \quad [\text{Math. 1}]$$

Basically, a state s, an action a, and a reward r are defined as follows to perform reinforcement learning (Q-learning).

The state s is a set of servo states of commands and feedback, including the values of control parameters $a_i$ and $b_j$ (i, j≥0) and positional deviation information of a servo control unit, acquired by a controller executing a plurality of evaluation programs, and the action a is adjustment of the control parameters $a_i$ and $b_j$ associated with the state s. The reward r is set as follows.

When state information s is corrected to state information s' by action information a, and the value of a positional deviation of the servo control unit operated on the basis of the control parameters $a_i$ and $b_j$ after correction associated with the state information s' becomes larger than the value of the positional deviation of the servo control unit operated on the basis of the control parameters $a_i$ and $b_j$ before correction associated with the state information s before being corrected by the action information a, the value of the reward is set to a negative value.

On the other hand, when the value of a positional deviation of the servo control unit operated on the basis of the control parameters $a_i$ and $b_j$ after correction associated with the state information s' becomes smaller than the value of the positional deviation of the servo control unit operated on the basis of the control parameters $a_i$ and $b_j$ before correction associated with the state information s before being corrected by the action information a, the value of the reward is set to a positive value.

A machining program that designates an axial moving distance, a feed speed, and the like depending on a machining shape during learning using a circle, a quadrangle, a square with quarter arc, and the like, for example, as the machining shape during learning is used as an evaluation program. This is because it is possible to evaluate inertial movement occurring when a rotation direction is reversed or rotation stops depending on the machining shape designated by the evaluation program and to compare the influences on the positional deviation.

It is possible to update a value function Q by performing Q-learning on the basis of the state s, the action a, the state s' when the action a is applied to the state s, and the reward r calculated in the above-described manner.

Basically, the state information s is acquired by a machine learning device, the action a is generated by the machine learning device, and the value function Q(s,a) is updated by the machine learning device on the basis of the reward r when the state information s is corrected to the state information s' on the basis of the action information a.

By repeatedly performing such Q-learning, it is possible to select an optimal action a (that is, optimal control parameters $a_i$ and $b_j$) with respect to the state s including a servo state such as commands and feedback, including the values of the control parameters $a_i$ and $b_j$ and positional deviation information of a servo control unit acquired by executing a plurality of evaluation programs using a controller.

The optimal action information includes information for correcting the control parameters $a_i$ and $b_j$. The information for correcting the control parameters $a_i$ and $b_j$ is parameter-setting information obtained by machine learning.

The controller operates such that the control parameters $a_i$ and $b_j$ are corrected on the basis of the action information and the order of the speed feed-forward being made higher so that the value of a positional deviation is decreased.

In this manner, by using machine learning, high-order parameter adjustment of the speed feed-forward of the controller can be simplified.

Patent Document 1 discloses a technique in which a neural network receives the output of a feed-forward compensator and a feedback compensator as an input and outputs an operation amount. In this technique, the weights of respective layers of a neural network are changed so that the output of a control target is equal to a signal obtained by adding the output of the neural network to the output of a linear model whereby the feedback compensator is obtained by machine learning.

Patent Document: Japanese Unexamined Patent Application, Publication No. H07-210207

SUMMARY OF THE INVENTION

However, since it cannot be guaranteed that the high-order mathematical model obtained from machine learning is completely identical to an actual mathematical model, although a satisfactory result is obtained in many cases, it cannot be guaranteed that a satisfactory result will be obtained in all cases.

An object of the present invention is to provide a controller capable of preventing a control target from being controlled by an abnormal correction amount when the correction amount output from a mathematical model which uses coefficients obtained by machine learning has an abnormal value.

(1) According to the present invention, there is provided a controller (for example, a "controller 100" to be described later) that controls a servomotor and a spindle motor of a machine tool, a robot, and an industrial machine, including: a control unit (for example, a "control unit 110" to be described later), wherein the control unit includes: a first correction amount computation unit (for example, a "first correction amount computation unit 113" to be described later) that computes a first correction amount for correction from a command value to a second command value; a second correction amount computation unit (for example, a "second correction amount computation unit 114" to be described later) that computes a second correction amount for correction from the command value to the second command value; and a correction amount selecting unit (for example, a "correction amount selecting unit 116" to be described later) that selects either one of the first correction amount and the second correction amount, wherein the first correction amount computation unit is based on a first mathematical model, and parameters of the first mathematical model are determined by machine learning, and the second correction amount computation unit is based on a second mathematical model, and parameters of the second mathematical model are determined by a method different from that of the first correction amount computation unit.

(2) In the controller (for example, a "controller 100" to be described later) according to (1), the control unit (for example, a "control unit 110" to be described later) preferably further includes: a correction amount comparing unit (for example, a "correction amount comparing unit 115" to be described later) that compares the first correction amount computed by the first correction amount computation unit and the second correction amount computed by the second correction amount computation unit; and an abnormality detection unit (for example, an "abnormality detection unit 117" to be described later) that detects an abnormality on the basis of a comparison result obtained by the correction amount comparing unit.

(3) In the controller (for example, a "controller 100" to be described later) according to (2), the abnormality detection unit (for example, an "abnormality detection unit 117" to be described later) may detect an abnormality when an absolute value of a difference between the first correction amount computed by the first correction amount computation unit and the second correction amount computed by the second correction amount computation unit is equal to or larger than a predetermined value.

(4) In the controller (for example, a "controller 100" to be described later) according to (2), the abnormality detection unit (for example, an "abnormality detection unit 117" to be described later) may detect an abnormality when an absolute value of a ratio of the first correction amount computed by the first correction amount computation unit to the second correction amount computed by the second correction amount computation unit is equal to or larger than a predetermined value.

(5) In the controller (for example, a "controller 100" to be described later) according to any one of to (4), when the abnormality detection unit (for example, an "abnormality detection unit 117" to be described later) detects the abnormality, the correction amount selecting unit (for example, a "correction amount selecting unit 116" to be described later) preferably selects the second correction amount computed by the second correction amount computation unit as a correction amount created from the command value.

(6) In the controller (for example, a "controller 100" to be described later) according to any one of (2) to (5), the control unit (for example, a "control unit 110" to be described later) preferably further includes: a warning output unit (for example, a "warning output unit 118" to be described later) that outputs a warning to the outside of the controller when the abnormality detection unit (for example, an "abnormality detection unit 117" to be described later) detects the abnormality.

(7) In the controller (for example, a "controller 100" to be described later) according to any one of (2) to (5), the control unit (for example, a "control unit 110" to be described later) preferably further includes: a stopping unit (for example, a "stopping unit 119" to be described later) that outputs an alarm and stops an operation of the controller when the abnormality detection unit (for example, an "abnormality detection unit 117" to be described later) detects the abnormality.

(8) In the controller (for example, a "controller 100" to be described later) according to any one of (1) to (7), an order of the second mathematical model may be equal to or lower than an order of the first mathematical model.

(9) In the controller (for example, a "controller 100" to be described later) according to any one of (1) to (8), the command value may be a position command value and the second command value may be a speed command value or a current command value.

(10) In the controller (for example, a "controller 100" to be described later) according to any one of (1) to (8), the command value may be a speed command value and the second command value may be a current command value.

According to the present invention, it is possible to provide a controller capable of preventing a control target from being controlled by an abnormal correction amount when the correction amount output from a mathematical model which uses coefficients obtained by machine learning has an abnormal value.

DETAILED DESCRIPTION OF THE INVENTION

First Embodiment

Figure 1:
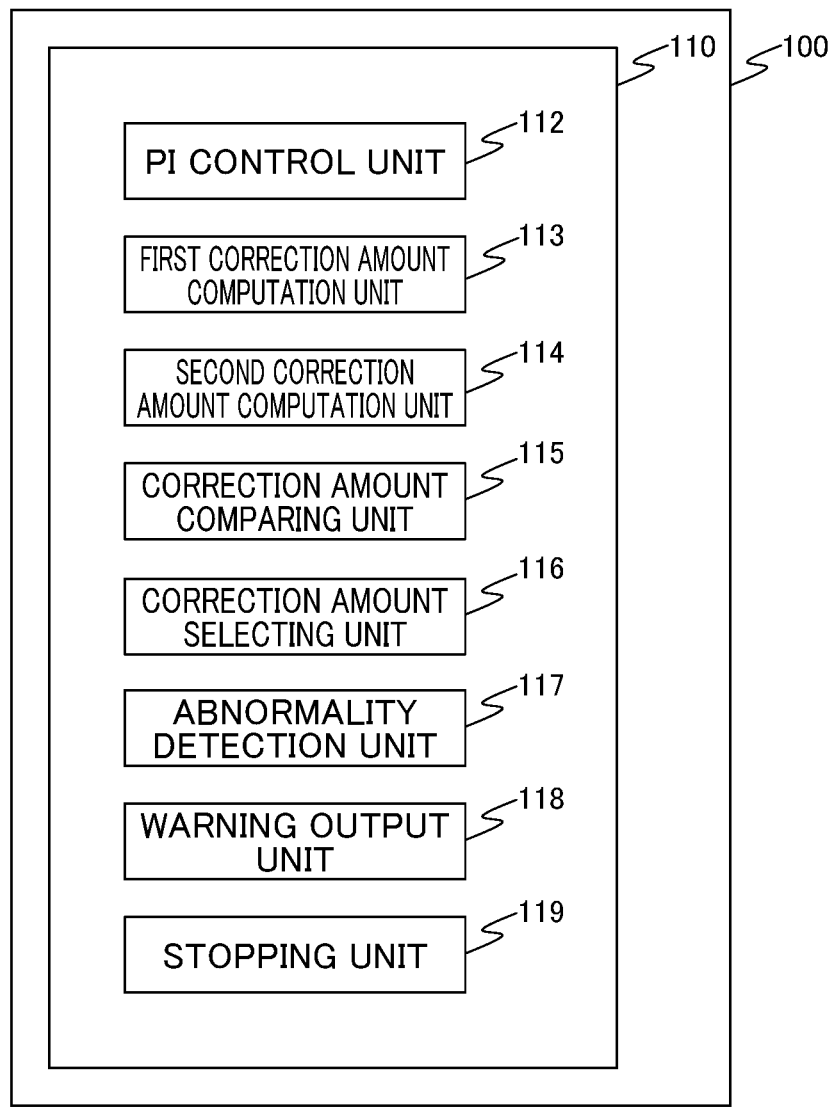
FIG. 1 is a functional block diagram of a controller according to a first embodiment of the present invention.

A controller 100 is a controller that controls a servomotor and a spindle motor of a machine tool, a robot, and an industrial machine and includes a control unit 110. FIG. 1 is a functional block diagram illustrating a configuration of the control unit 110 included in the controller 100. The control unit 110 is a portion that controls the entire controller 100 and realizes various functions of the present embodiment by appropriately reading and executing various programs from a storage area such as a ROM, a RAM, a flash memory, or a hard disk (HDD). The control unit 110 may be a CPU. The control unit 110 includes a PI control unit 112, a first correction amount computation unit 113, a second correction amount computation unit 114, a correction amount comparing unit 115, a correction amount selecting unit 116, an abnormality detection unit 117, a warning output unit 118, and a stopping unit 119.

The PI control unit 112 generates a control command by PI control from a command which is an input from a numerical controller (not illustrated) or a command generated by the controller 100 and a feedback from a control target device 300, and outputs the control command. The control command output from the PI control unit 112 is input to the control target device 300.

The first correction amount computation unit 113 calculates control parameters of a first transfer function by machine learning in advance in a process of performing a feed-forward computation process represented by the first transfer function based on a predetermined first mathematical model and calculating a first correction amount for correction from a command to a control command. The first correction amount computation unit 113 computes the first correction amount for correction from the command generated by the controller 100 or the command which is an input from a numerical controller (not illustrated) to the control command.

In contrast, the second correction amount computation unit 114 calculates control parameters of a second transfer function by an adjustment process which has been performed conventionally by a skilled person or the like, for example, and is different from machine learning, in a process of performing a feed-forward computation process represented by the second transfer function based on a predetermined second mathematical model and calculating a second correction amount for correction from a command to a control command. Due to this, the order of the second mathematical model is equal to or lower than the order of the first mathematical model. The second correction amount computation unit 114 computes the first correction amount for correction from the command which is the input from the numerical controller (not illustrated) or the command generated by the controller 100 to the control command.

The correction amount comparing unit 115 compares the first correction amount computed by the first correction amount computation unit 113 with the second correction amount computed by the second correction amount computation unit 114.

The correction amount selecting unit 116 selects either one of the first correction amount computed by the first correction amount computation unit 113 and the second correction amount computed by the second correction amount computation unit 114. More basically, when a comparison result obtained by the correction amount comparing unit 115, between the first correction value computed by the first correction amount computation unit 113 and the second correction value computed by the second correction amount computation unit 114, satisfies a predetermined condition (hereinafter also referred to as a "priority condition"), the correction amount selecting unit 116 selects the first correction amount computed by the first correction amount computation unit 113 more preferentially than the second correction amount computed by the second correction amount computation unit 114. In contrast, when the comparison result obtained by the correction amount comparing unit 115, between the first correction value computed by the first correction amount computation unit 113 and the second correction value computed by the second correction amount computation unit 114, does not satisfy the predetermined priority condition, the correction amount selecting unit 116 selects the second correction amount computed by the second correction amount computation unit 114 more preferentially than the first correction amount computed by the first correction amount computation unit 113. Here, for example, a condition that an absolute value of the difference between the first correction amount computed by the first correction amount computation unit 113 and the second correction amount computed by the second correction amount computation unit 114 is equal to or smaller than a predetermined first threshold may be used as the predetermined priority condition. Moreover, a condition that an absolute value of the ratio of the first correction amount computed by the first correction amount computation unit 113 to the second correction amount computed by the second correction amount computation unit 114 is equal to or smaller than a predetermined second threshold may be used. These conditions are examples only and are not limited thereto.

When the comparison result obtained by the correction amount comparing unit 115, between the first correction value computed by the first correction amount computation unit 113 and the second correction value computed by the second correction amount computation unit 114, does not satisfy the predetermined priority condition, the abnormality detection unit 117 detects an abnormality in the first correction amount computation unit 113. That is, the first correction amount computation unit 113 detects that an abnormal correction amount has been calculated. As described above, for example, the abnormality detection unit 117 can detect an abnormality in the first correction amount computation unit 113 when the absolute value of the difference between the first correction amount computed by the first correction amount computation unit 113 and the second correction amount computed by the second correction amount computation unit 114 is equal to or larger than the predetermined first threshold. Moreover, the abnormality detection unit 117 may detect an abnormality in the first correction amount computation unit 113 when the absolute value of the ratio of the first correction amount computed by the first correction amount computation unit 113 to the second correction amount computed by the second correction amount computation unit 114 is equal to or smaller than the predetermined second threshold.

When the abnormality detection unit 117 detects that the first correction amount computation unit 113 has output an abnormal correction amount, the warning output unit 118 outputs a warning in order to notify the outside of the controller 100 of the occurrence of an abnormality in the first correction amount computation unit 113. The warning output unit 118 may output (record) a servo state of commands and feedback, including positional deviation information of the servo control unit when the first correction amount computation unit 113 has output the abnormal correction amount. When the warning output unit 118 outputs a warning indicating that an abnormality has occurred in the first correction amount computation unit 113, the correction amount selecting unit 116 selects the second correction amount computed by the second correction amount computation unit 114 more preferentially than the first correction amount computed by the first correction amount computation unit 113. In this way, when the correction amount output from the first correction amount computation unit 113 based on the high-order first mathematical model calculated using the control parameter calculated by machine learning in advance has an abnormal value, it is possible to prevent the control target from being controlled by the abnormal correction amount.

The operation of the controller 100 may be stopped when the correction amount output from the first correction amount computation unit 113 has an abnormal value. The stopping unit 119 outputs an alarm and stops the operation of the controller 100 when the abnormality detection unit 117 detects an abnormality in the correction amount output from the first correction amount computation unit 113. The stopping unit 119 may determine whether a machining process is to be stopped on the basis of a frequency or the like in which an abnormality in the correction amount output from the first correction amount computation unit 113 of the abnormality detection unit 117 is detected, for example. Moreover, the stopping unit 119 may output a message regarding whether or not to stop the operation to an operator and stop the operation of the controller 100 on the basis of a stop instruction from the operator.

While the functional blocks of the controller 100 have been described, the above-described functional blocks are portions that are particularly associated with the operation of the present embodiment. The controller 100 includes ordinary functional blocks in addition to the above-described functional blocks. For example, the controller 100 includes a servomotor for moving a work, a control unit for controlling the servomotor, a position and speed detector for performing position and speed feedback control, a motor driving amplifier for amplifying an operation command, an operation panel for receiving a user's operation, and the like. However, since these ordinary functional blocks are well known to an ordinary person skilled in the art, detailed descriptions and illustrations thereof will be omitted.

Figure 2:
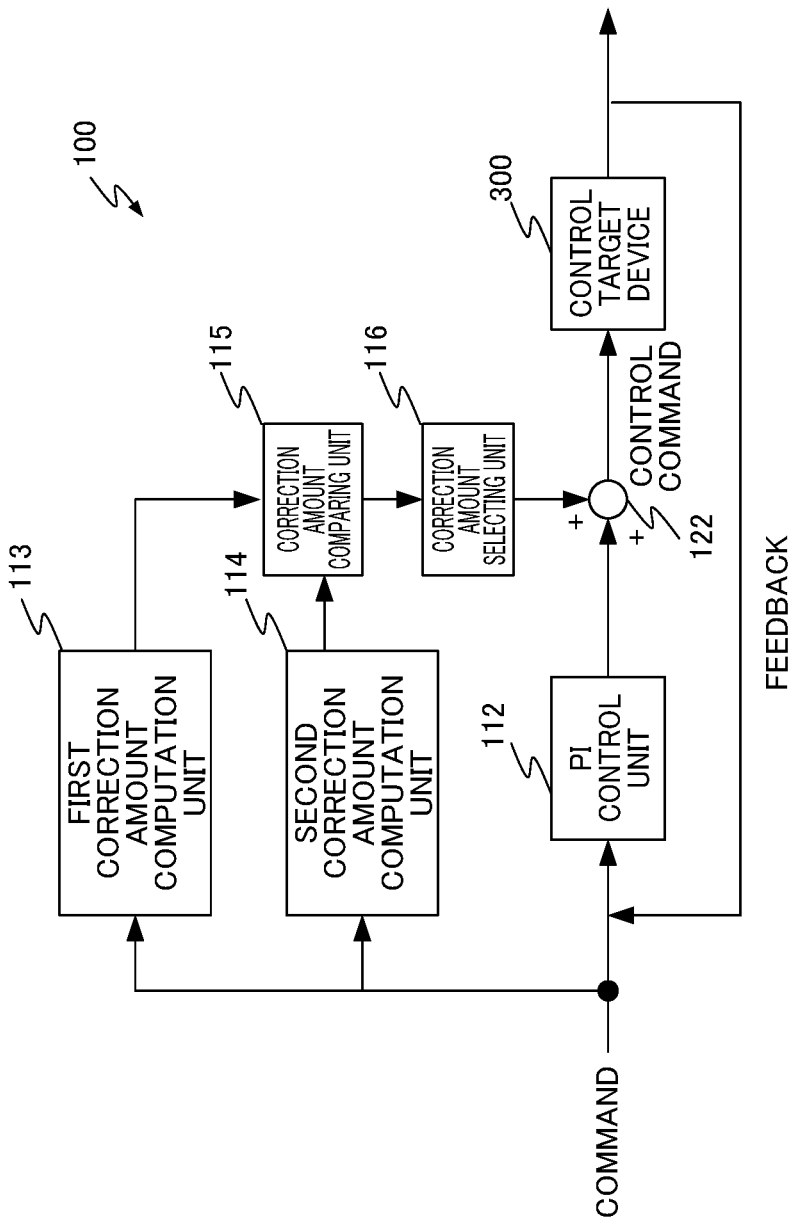
FIG. 2 is a diagram illustrating an input-output flow of the controller according to the first embodiment of the present invention.

Next, a feed-forward process of the controller 100 will be described with reference to FIG. 2. FIG. 2 is a diagram illustrating the flow of a feed-forward process of the controller 100. The controller 100 includes an adder 122 in addition to the PI control unit 112, the first correction amount computation unit 113, the second correction amount computation unit 114, the correction amount comparing unit 115, the correction amount selecting unit 116.

The PI control unit 112 generates a control command on the basis of a command which is an input from a numerical controller (not illustrated) or a command generated by the controller 100 and a feedback from the control target device 300 and outputs the control command to the adder 122.

The first correction amount computation unit 113 computes a first correction amount for correction from the command to the control command Basically, the first correction amount computation unit 113 performs a feed-forward computation process using the high-order first mathematical model of which the values of the control parameters are determined by machine learning and computes the first correction amount for correction from the command to the control command.

The second correction amount computation unit 114 performs a feed-forward computation process on the basis of the second mathematical model of which the values of the control parameters are determined according to a conventional method different from machine learning (the order of the second mathematical model is equal to or lower than that of the first mathematical model of the first correction amount computation unit 113) and computes the second correction amount for correction from the command to the control command.

The correction amount comparing unit 115 compares the first correction amount computed by the first correction amount computation unit 113 with the second correction amount computed by the second correction amount computation unit 114. The correction amount selecting unit 116 selects either one of the first correction amount and the second correction amount on the basis of the comparison result obtained by the correction amount comparing unit 115 and outputs the selected correction amount to the adder 122.

The adder 122 adds the correction amount selected by the correction amount selecting unit 116 to the control command and outputs an addition result to the control target device 300 as a feed-forward-controlled control command.

The control target device 300 receives the control command as an input and outputs a feedback, and the feedback is input to a front stage of the PI control unit 112. The input-output flow of the controller 100 is configured in this manner.

Figure 3:
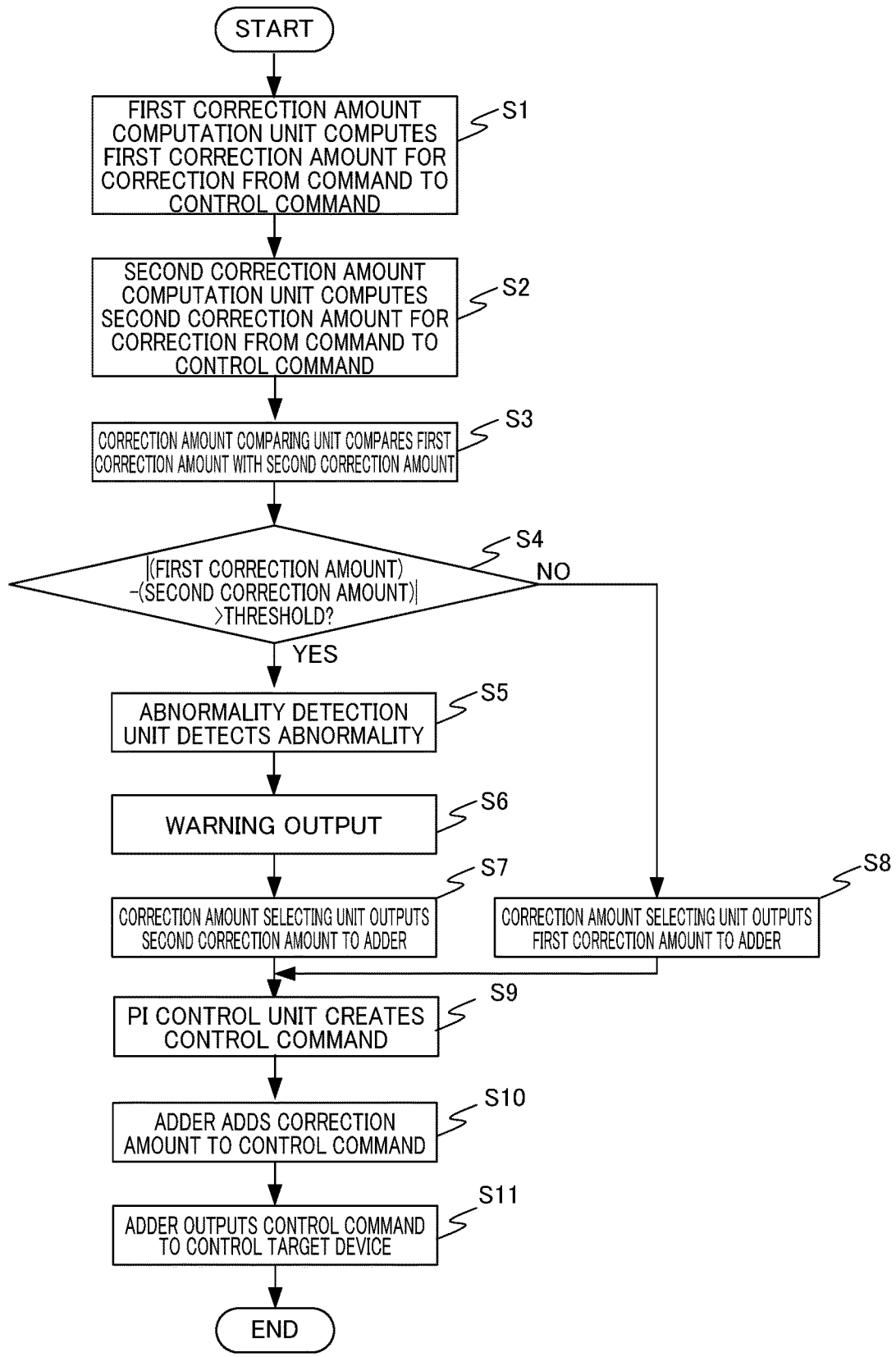
FIG. 3 is a flowchart illustrating an operation of the controller according to the first embodiment of the present invention.

Next, the operation of the controller 100 will be described. FIG. 3 illustrates an operation flow of the controller 100.

In step S1, the first correction amount computation unit 113 computes a first correction amount for correction to a control command from the command which is an input from a numerical controller (not illustrated) or the command generated by the controller.

In step S2, the second correction amount computation unit 114 computes a second correction amount for correction from the command to the control command.

In step S3, the correction amount comparing unit 115 compares the first correction amount with the second correction amount.

In step S4, when an absolute value of the difference between the first correction amount and the second correction amount exceeds a threshold (S4: YES), the flow proceeds to step S5. When the absolute value of the difference between the first correction amount and the second correction amount is equal to or smaller than the threshold. (S4: NO), the flow proceeds to step S8.

In step S5, the abnormality detection unit 117 detects an abnormality. In step S6, the warning output unit 118 outputs a warning to the outside of the controller 100.

In step S7, the correction amount selecting unit 116 selects the second correction amount among the first and second correction amounts and outputs the second correction amount to the adder 122.

In step S8, the correction amount selecting unit 116 selects the first correction amount among the first and second correction amounts and outputs the first correction amount to the adder 122.

In step S8, the PI control unit 112 generates a control command on the basis of the command and a feedback from the control target and outputs the control command to the adder 122.

In step S10, the adder 122 adds the correction amount input from the correction amount selecting unit 116 to the control command input from the PI control unit 112.

In step S11, the adder 122 outputs a control command to which the correction amount is added to the control target device 300.

In the above-described flow, although the absolute value of the difference between the first correction amount and the second correction amount is compared with the threshold in step S4, the present invention is not limited thereto. For example, the absolute value of the ratio of the first correction amount to the second correction amount may be compared with a threshold.

In the above-described flow, although the warning output unit 118 outputs a warning to the outside of the controller 100 in step 36, the present invention is not limited thereto. For example, instead of the flow subsequent to step S6, the stopping unit 119 may output an alarm and may stop the operation of the controller 100.

In the above description, although the first correction amount computation unit 113 computes the first correction amount for correction from the command to the control command and the second correction amount computation unit 114 computes the second correction amount for correction from the command to the control command, the following may be considered as a specific example thereof.

For example, the PI control unit 112 may create a current command value from a position command value and a position feedback value, the first correction amount computation unit 113 may compute a first current command value correction amount for correction from the position command value to the current command value, and the second correction amount computation unit 114 may compute a second current command value correction amount for correction from the position command value to the current command value.

Alternatively, the PI control unit 112 may create a speed command value from a position command value and a position feedback value, the first correction amount computation unit 113 may compute a first speed command value correction amount for correction from the position command value to the speed command value, and the second correction amount computation unit 114 may compute a second speed command value correction amount for correction from the position command value to the speed command value.

Alternatively, the PI control unit 112 may create a current command value from a speed command value and a speed feedback value, the first correction amount computation unit 113 may compute a first current command value correction amount for correction from the speed command value to the current command value, and the second correction amount computation unit 114 may compute a second current command value correction amount for correction from the speed command value to the current command value.

Advantages of First Embodiment

According to the controller 100 of the present embodiment, either a first correction amount computed using a first mathematical model (of a high order) of which the control parameters are determined by machine learning or a second correction amount computed using a second mathematical model of which the control parameters are determined by a method different from machine learning is selected as a correction amount for correction from a command to a control command. In this way, it is possible to use an appropriate correction amount.

By detecting an abnormality in the first correction amount computed using the first mathematical model (of a high order) of which the control parameters are determined by machine learning, it is possible to prevent the control command from being corrected based on an abnormal value and a machine from being controlled on the basis of an abnormal control command.

When an abnormality in the first correction amount is detected, a warning is output to the outside of the controller 100, whereby a user can recognize that the correction value for correcting the control command is calculated using the second mathematical model of which the control parameters are determined by a method different from machine learning.

When an abnormality in the first correction amount is detected, an alarm is output and the operation of the controller 100 is stopped, whereby the control target can be prevented from being controlled using an abnormal value.

Since the order of the second mathematical model is equal to or lower than the order of the first mathematical model, it is possible to use a mathematical model of which the control parameters are determined more easily than the first mathematical model which uses machine learning, as the second mathematical model.

Second Embodiment

Figure 4:
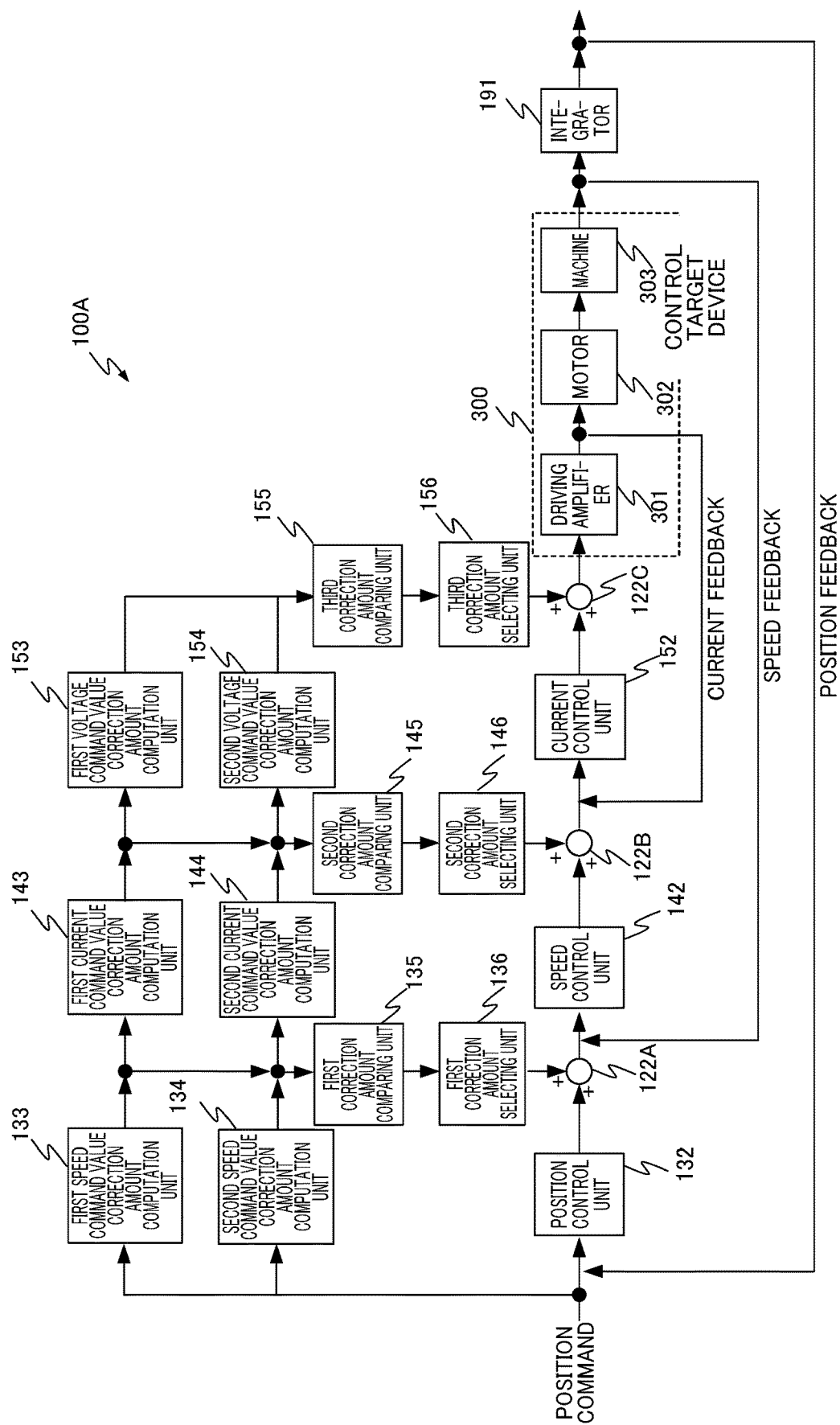
FIG. 4 is a diagram illustrating an input-output flow of a controller according to a second embodiment of the present invention.

FIG. 4 illustrates an input-output flow of a controller 100A according to a second embodiment of the present invention. The controller 100A includes a position control unit 132, a first speed command value correction amount computation unit 133, a second speed command value correction amount computation unit 134, a first correction amount comparing unit 135, a first correction amount selecting unit 136, a speed control unit 142, a first current command value correction amount computation unit 143, a second current command value correction amount computation unit 144, a second correction amount comparing unit 145, a second correction amount selecting unit 146, a current control unit 152, a first voltage command value correction amount computation unit 153, a second voltage command value correction amount computation unit 154, a third correction amount comparing unit 155, a third correction amount selecting unit 156, and adders 122A to 122C.

The position control unit 132 generates a speed command value from a position command value which is an input from a numerical controller (not illustrated) or a position command value generated by the controller 100, and a position feedback value which is the output from an integrator 191 to be described later.

The first speed command value correction amount computation unit 133 computes a first speed command value correction amount for correction from the position command value to a speed command value. The second speed command value correction amount computation unit 134 computes a second speed command value correction amount for correction from the position command value to a speed command value. The first correction amount comparing unit 135 compares the first speed command value correction amount with the second speed command value correction amount. The first correction amount selecting unit 136 selects either one of the first speed command value correction amount and the second speed command value correction amount on the basis of a comparison result obtained by the first correction amount comparing unit 135 and outputs the selected correction amount to the adder 122A. The adder 122A adds the correction amount to the speed command value from the position control unit 132 to obtain a corrected speed command value and outputs the corrected speed command value to the speed control unit 142.

The speed control unit 142 generates a current command value from the speed command value which is the input from the adder 122A and a speed feedback value which is the output from a machine 303 to be described later.

The first current command value correction amount computation unit 143 computes a first current command value correction amount for correct on to the current command value from the position command value input via the first speed command value correction amount computation unit 133. Similarly, the second current command value correction amount computation unit 144 computes a second current command value correction amount for correction to the current command value from the position command value input via the second speed command value correction amount computation unit 134. The second correction amount comparing unit 145 compares the first current command value correction amount with the second current command value correction amount. The second correction amount selecting unit 146 selects either one of the first current command value correction amount and the second current command value correction amount on the basis of a comparison result obtained by the second correction amount comparing unit 145 and outputs the selected correction amount to the adder 122B. The adder 122B adds the correction amount to the current command value from the speed control unit 142 to obtain a corrected current command value and outputs the corrected current command value to the current control unit 152.

The current control unit 152 generates a voltage command value from the current command value which is the input from the adder 122B and a current feedback value which is the output of a driving amplifier 301 to be described later.

The first voltage command value correction amount computation unit 153 computes a first voltage command value correction amount for correction to the voltage command value from the position command value input via the first speed command value correction amount computation unit 133 and the first current command value correction amount computation unit 143. Similarly, the second voltage command value correction amount computation unit 154 computes a second voltage command value correction amount for correction to the voltage command value from the position command value input via the second speed command value correction amount computation unit 134 and the second current command value correction amount computation unit 144. The third correction amount comparing unit 155 compares the first voltage command value correction amount with the second voltage command value correction amount. The third correction amount selecting unit 156 selects either one of the first voltage command value correction amount and the second voltage command value correction amount on the basis of a comparison result obtained by the third correction amount comparing unit 155 and outputs the selected correction amount to the adder 122C. The adder 122C adds the correction amount to the voltage command value from the current control unit 152 to obtain a corrected voltage command value and outputs the corrected voltage command value to the control target device 300.

The control target device 300 includes the driving amplifier 301, the motor 302, and the machine 303. The driving amplifier 301 supplies a current for driving the motor 302 to the motor 302. A rotational movement of the shaft of the motor 302 is converted to a physical operation of the machine 303.

A portion of the current supplied from the driving amplifier 301 to the motor 302 is output to the front stage of the current control unit 152 as a current feedback. A portion of the output from the machine 303 is output to the front stage of the speed control unit 142 as a speed feedback value obtained by the integrator 191 integrating the output from the machine 303 is output to the front stage of the position control unit 132 as a position feedback.

Advantages of Second Embodiment

The second embodiment, provides the same advantages as those of the first embodiment.

Third Embodiment

Figure 5:
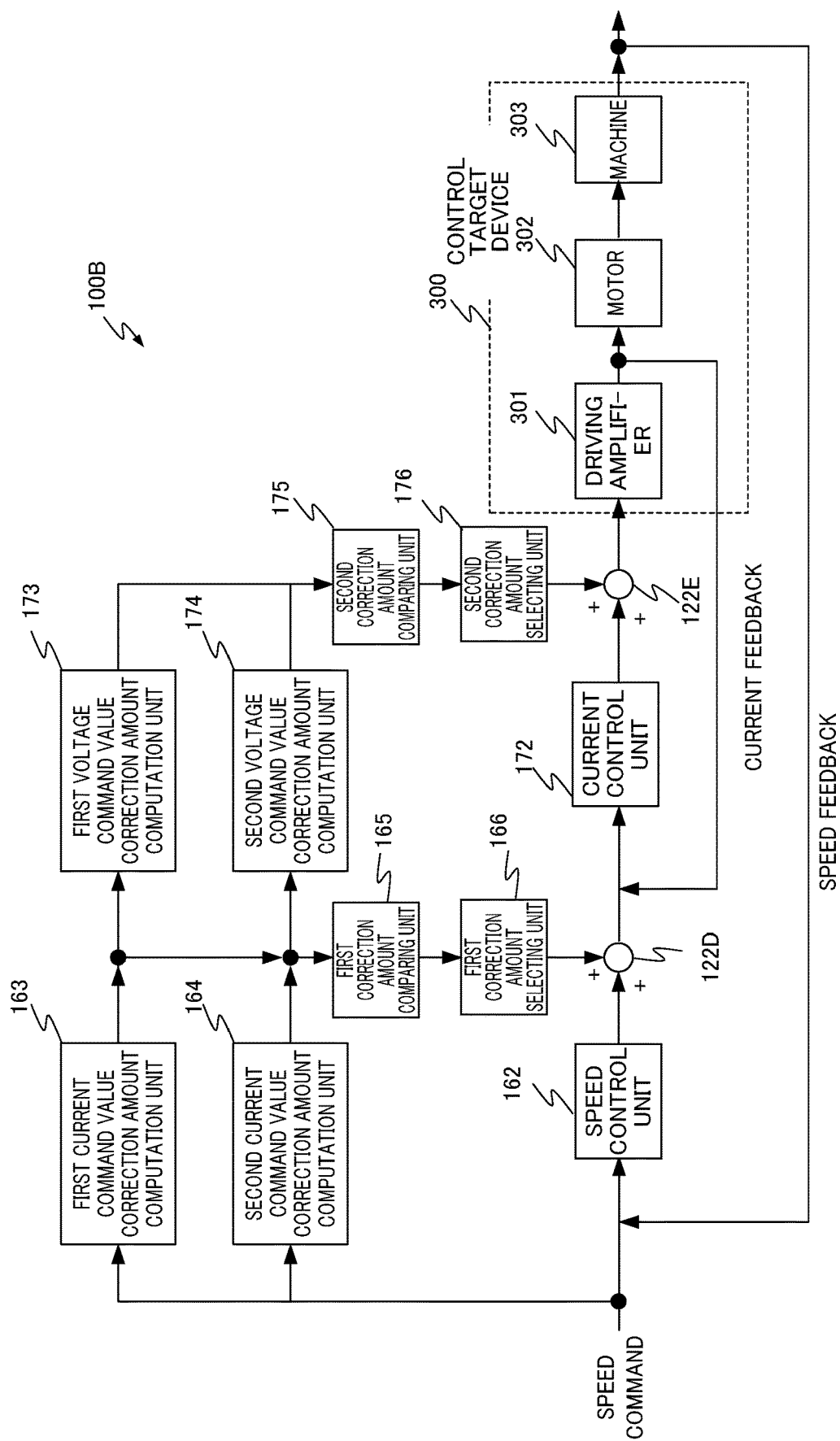
FIG. 5 is a diagram illustrating an input-output flow of a controller according to a third embodiment of the present invention.

FIG. 5 illustrates an input-output flow of a controller 100B according to a third embodiment of the present invention. The controller 100B includes a speed control unit 162, a first current command value correction amount computation unit 163, a second current command value correction amount computation unit 164, a first correction amount comparing unit 165, a first correction amount selecting unit 166, a current control unit 172, a first voltage command value correction amount computation unit 173, a second voltage command value correction amount computation unit 174, a second correction amount comparing unit 175, a second correction amount selecting unit 176, and adders 122D to 122E.

The speed control unit 162 generates a current command value from a speed command value generated by the controller 100B and a speed feedback value which is a portion of the output from the machine 303 to be described later.

The first current command value correction amount computation unit 163 computes a first current command value correction amount for correction from the speed command value to the current command value. The second current command value correction amount computation unit 164 computes a second current command value correction amount for correction from the speed command value to the current command value. The first correction amount comparing unit 165 compares the first current command value correction amount with the second current command value correction amount. The first correction amount selecting unit 166 selects either one of the first current command value correction amount and the second current command value correction amount on the basis of a comparison result obtained by the first correction amount comparing unit 165 and outputs the selected correction amount to the adder 122D. The adder 122D adds the correction amount to the current command value from the speed control unit 162 to obtain a corrected current command value and outputs the corrected current command value to the current control unit 172.

The current control unit 172 generates a voltage command value from the current command value which is the input from the adder 122D and a current feedback value which is a portion of the output from the driving amplifier 301 to be described later.

The first voltage command value correction amount computation unit 173 computes a first voltage command value correction amount for correction to the voltage command value from the speed command value input via the first current command value correction amount computation unit 163. Similarly, the second voltage command value correction amount computation unit 174 computes a second voltage command value correction amount for correction to the voltage command value from the speed command value input via the second current command value correction amount computation unit 164. The second correction amount comparing unit 175 compares the first voltage command value correction amount with the second voltage command value correction amount. The second correction amount selecting unit 176 selects either one of the first voltage command value correction amount and the second voltage command value correction amount on the basis of a comparison result obtained by the second correction amount comparing unit 175 and outputs the selected correction amount to the adder 122E. The adder 122E adds the correction amount to the voltage command value from the current control unit 172 to obtain a corrected voltage command value and outputs the corrected voltage command value to the control target device 300.

A portion of the current supplied from the driving amplifier 301 to the motor 302 is output to the front stage of the current control unit 172 as a current feedback value. A portion of the output from the machine 303 is output to the front stage of the speed control unit 162 as a speed feedback value.

Advantages of Third Embodiment

The third embodiment provides the same advantages as those of the first embodiment.

Fourth Embodiment

Figure 6:
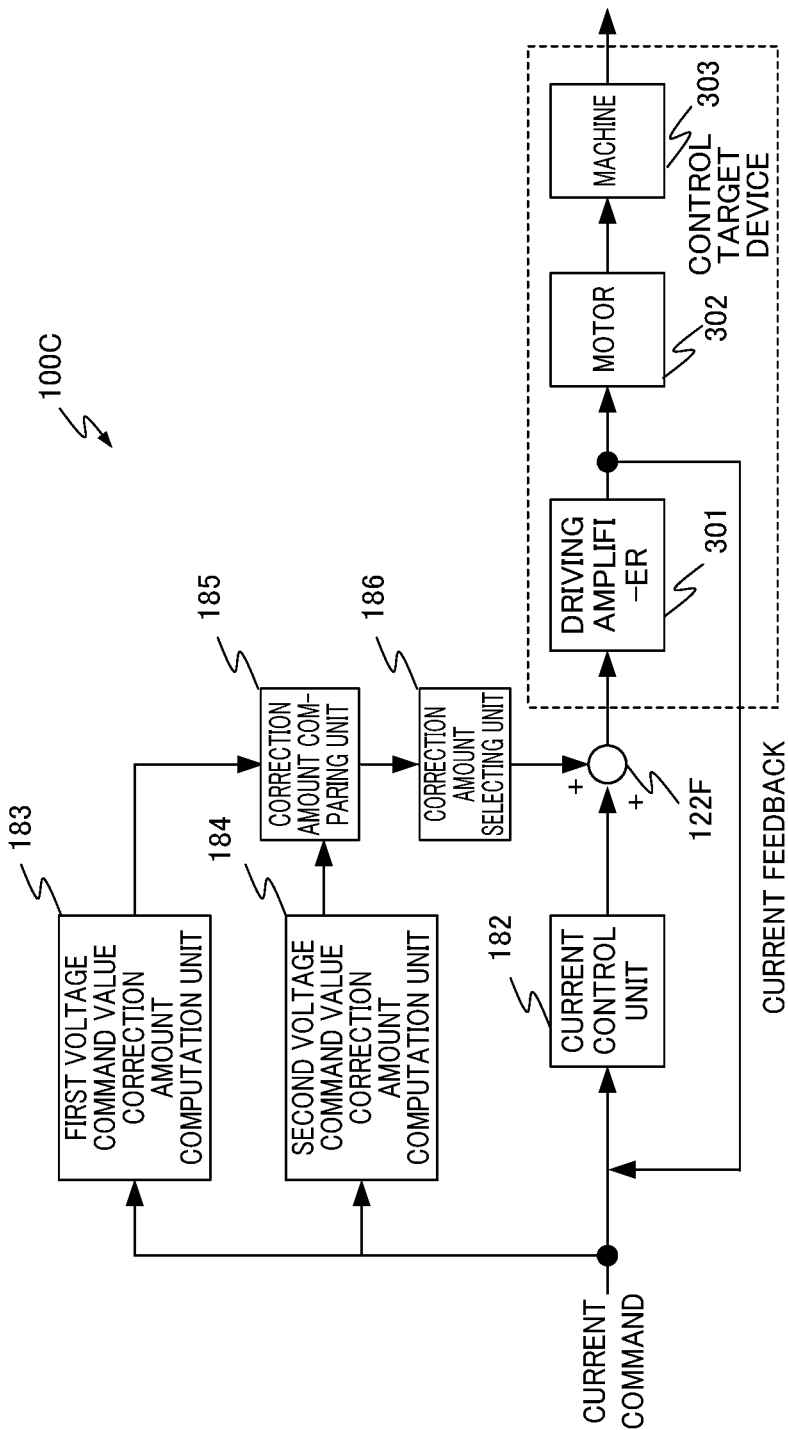
FIG. 6 is a diagram illustrating an input-output flow of a controller according to a fourth embodiment of the present invention.

FIG. 6 illustrates an input-output flow of a controller 100C according to a fourth embodiment of the present invention. The controller 100C includes a current control unit 182, a first voltage command value correction amount computation unit 183, a second voltage command value correction amount computation unit 184, a correction amount comparing unit 185, a correction amount selecting unit 186, and an adder 122F.

The current control unit 182 generates a voltage command value from the current command value generated by the controller 100C and a current feedback value which is a portion of the output from the driving amplifier 301.

The first voltage command value correction amount computation unit 183 computes a first voltage command value correction amount for correction from the current command value to the voltage command value. The second voltage command value correction amount computation unit 184 computes a second voltage command value correction amount for correction from the current command value to the voltage command value. The correction amount comparing unit 185 compares the first voltage command value correction amount with the second voltage command value correction amount. The correction amount selecting unit 186 selects either one of the first voltage command value correction amount and the second voltage command value correction amount on the basis of a comparison result obtained by the correction amount comparing unit 185 and outputs the selected correction amount to the adder 122F. The adder 122F adds the correction amount to the voltage command value from the current control unit 182 to obtain a corrected voltage command value and outputs the corrected voltage command value to the control target device 300.

A portion of the current value of the current supplied from the driving amplifier 301 to the motor 302 output to the current control unit 182 as a current feedback value.

Advantages of Fourth Embodiment

The fourth embodiment provides the same advantages as those of the first embodiment.

While embodiments of the present invention have been described, the present invention is not limited to the above-described embodiments. The advantages described in the present embodiment are examples of the most preferable advantages obtained from the present invention, and the advantages of the present invention are not limited to those described in the present embodiment.

EXPLANATION OF REFERENCE NUMERALS

100, 100A, 100B, 100C: Controller
110: Control unit
112: PI control unit
113: First correction amount computation unit
114: Second correction amount computation unit
115: Correction amount comparing unit
116: Correction amount selecting unit
117: Abnormality detection unit
118: Warning output unit
119: Stopping unit

What is claimed is:
1. A controller that controls a servomotor and a spindle motor of a machine tool, a robot, and an industrial machine, comprising:
   a control unit, wherein
   the control unit includes:
   a first correction amount computation unit that computes a first correction amount for correction from a command value to a second command value;
   a second correction amount computation unit that computes a second correction amount for correction from the command value to the second command value;
   a correction amount selecting unit that selects either one of the first correction amount and the second correction amount,
   a correction amount comparing unit that compares the first correction amount computed by the first correction amount computation unit and the second correction amount computed by the second correction amount computation unit;
   an abnormality detection unit that detects an abnormality of the first correction amount on the basis of a comparison result obtained by the correction amount comparing unit; and
   a stopping unit that determines whether or not a machining process is to be stopped on the basis of a frequency in which an abnormality in the first correction amount is detected by the abnormality detection unit, wherein the first correction amount computation unit is based on a first mathematical model and parameters of the first mathematical model are determined by machine learning, the second correction amount computation unit is based on a second mathematical model and parameters of the second mathematical model are determined by a method different from that of the first correction amount computation unit, an order of the second mathematical model is equal to or lower than an order of the first mathematical model, and when the abnormality detection unit detects the abnormality, the correction amount selecting unit selects the second correction amount computed by the second correction amount computation unit as a correction amount created from the command value.

2. The controller according to claim 1, wherein the abnormality detection unit detects an abnormality when an absolute value of a difference between the first correction amount computed by the first correction amount computation unit and the second correction amount computed by the second correction amount computation unit is equal to or larger than a predetermined value.

3. The controller according to claim 1, wherein the abnormality detection unit detects an abnormality when an absolute value of a ratio of the first correction amount computed by the first correction amount computation unit to the second correction amount computed by the second correction amount computation unit is equal to or larger than a predetermined value.

4. The controller according to claim 1, wherein the control unit further includes:

a warning output unit that outputs a warning to the outside of the controller when the abnormality detection unit detects the abnormality.

5. The controller according to claim 1, wherein the command value is a position command value and the second command value is a speed command value or a current command value.

6. The controller according to claim 1, wherein the command value is a speed command value and the second command value is a current command value.

* * * * *